May 3, 1966  B. W. McARTHUR  3,248,941
SOAP FILM TYPE GAS FLOW MEASURING DEVICE
Filed Dec. 27, 1963  2 Sheets-Sheet 2

INVENTOR.
BILLY W. McARTHUR
BY George L. Church
ATTORNEY

United States Patent Office 3,248,941
Patented May 3, 1966

3,248,941
SOAP FILM TYPE GAS FLOW MEASURING
DEVICE
Billy W. McArthur, Richardson, Tex., assignor to Sun Oil
Company, Philadelphia, Pa., a corporation of New
Jersey
Filed Dec. 27, 1963, Ser. No. 333,816
5 Claims. (Cl. 73—194)

This invention relates to a device for measuring the flow of gases, and more particularly to a device particularly useful for measuring low gas flow rates.

In many cases, it is desirable to be able to accurately measure low rates of gas flow. For example, in gas chromatography it is desired to measure accurately low gas flow rates. Again, it is often desired to accurately measure low gas flow rates at high pressures. In connection with the production of petroleum, it is sometimes desired to measure, accurately, flow rates through porous media, to determine the flow rate to pressure gradient relationship of the porous media; such flow rates are almost always rather low.

Prior devices for measuring low rates of gas flow leave something to be desired from the standpoints of accuracy, repeatability, etc.

An object of this invention is to provide a new and improved gas flow measuring device.

Another object is to provide a device by means of which low rates of gas flow may be measured with accuracy and precision.

Although "low" rates of gas flow have been previously alluded to, it is pointed out that the device of this invention is capable of accurate measurement of gas flow over a wide range of rates, from "very small" rates to "high" flow rates.

The objects of this invention are accomplished, briefly, in the following manner. At the lower end of a vertically-extending flow tube of known diameter, there is provided an arrangement for forming a soap "bubble" (actually, a flat, plate-like film) which can travel upwardly through the tube. The "bubble"-forming arrangement is manually operable, and one "bubble" is formed for each manual operation thereof. The gas whose flow rate is to be measured flows upwardly through the tube, and carries the "bubble" upwardly through such tube. At opposite ends of a measured length of the flow tube (this measured length providing, in combination with the known diameter of the tube, a known volume) there are mounted respective detecting devices which detect the passage of the soap "bubble" thereby, and give a signal in response thereto. These signals are conveyed to a timing device which measures the time required for the "bubble" to travel from one end to the other of the known volume; this time measurement determines the flow rate of the gas.

Figure 1:
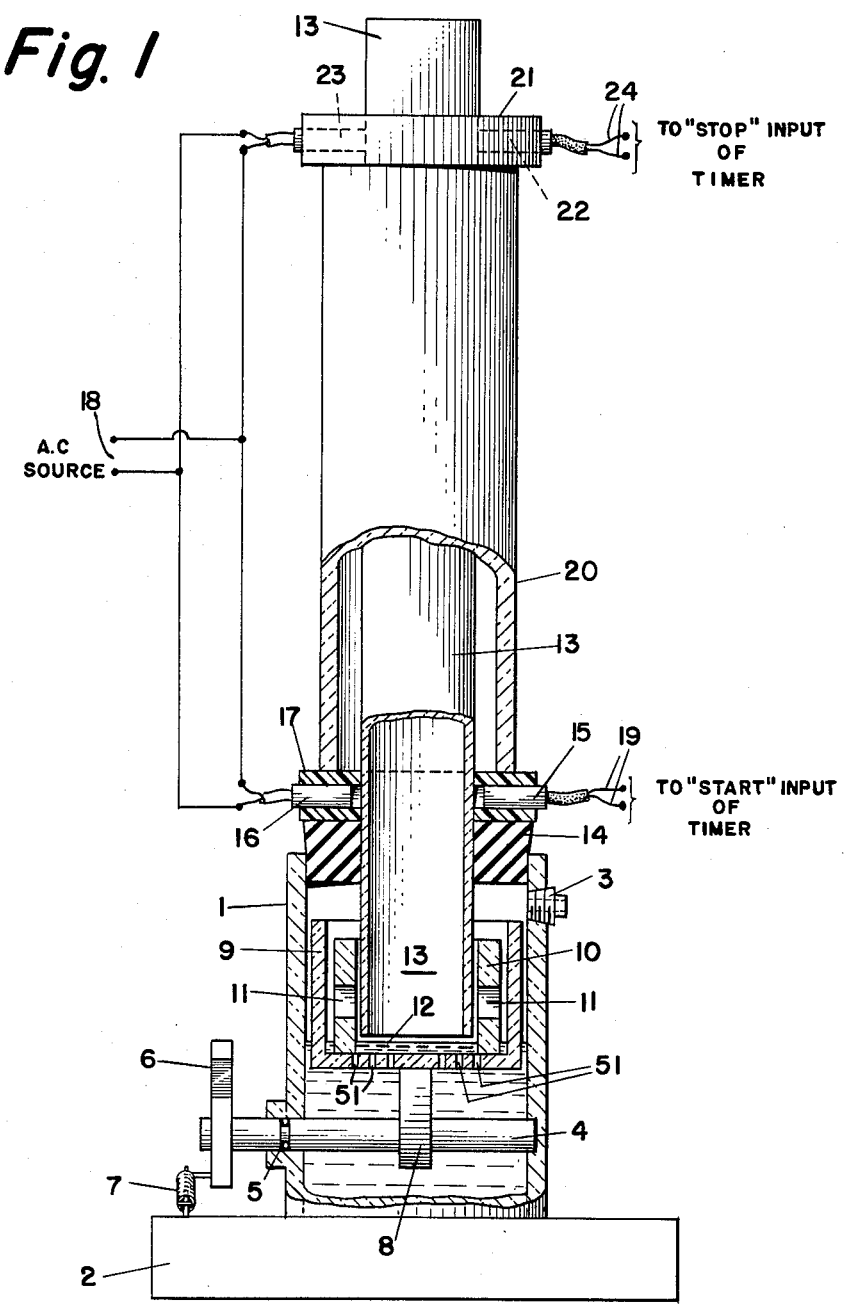
Figure 2:
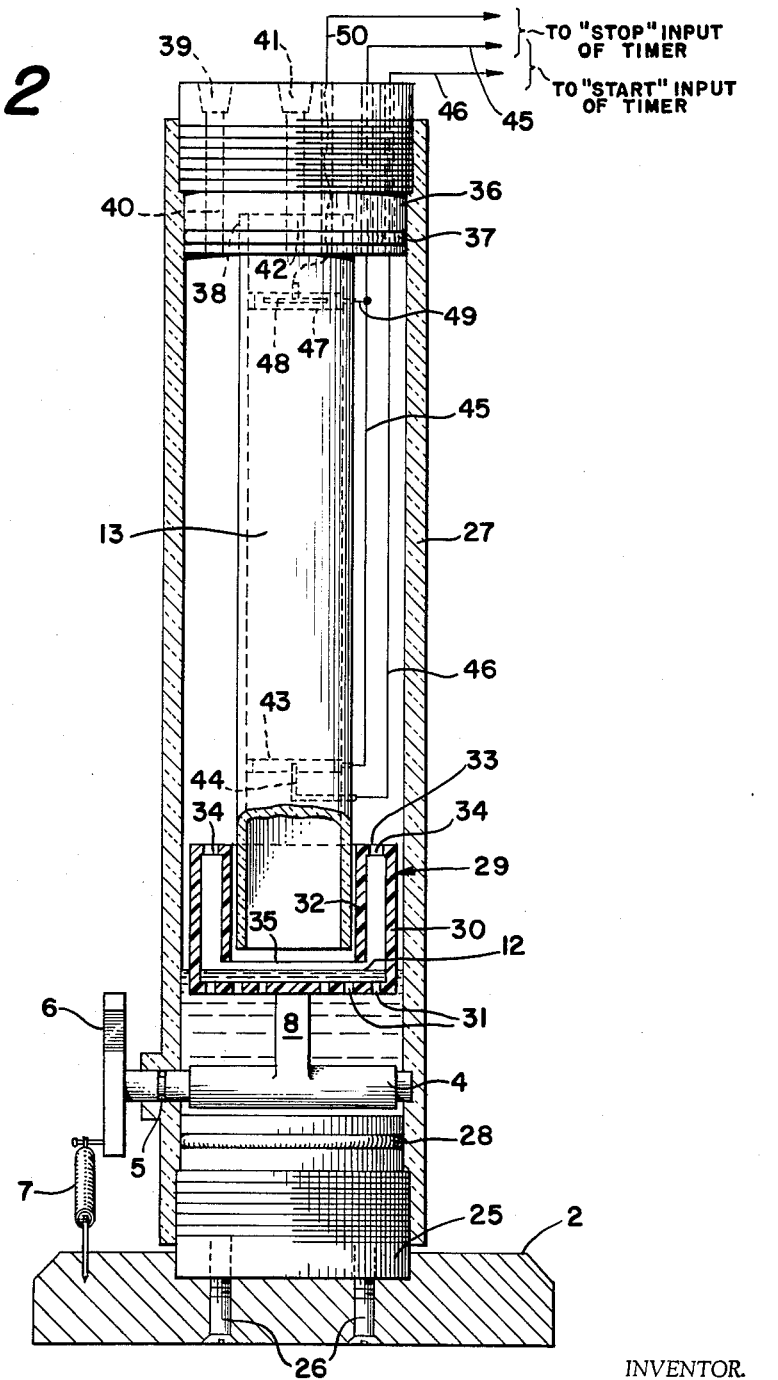

A detailed description of the invention follows, taken in conjunction with the accompanying drawings, wherein:

FIG. 1 is a vertical section through one form of gas flow measuring device according to this invention; and FIG. 2 is a vertical section through a modified construction.

First refer to FIG. 1. A tubular receptacle 1, having an open upper end, is mounted for supporting purposes on a supporting member or base 2. A suitable mounting which also provides a closure for the bottom end of the tube to form a cup-shaped receptacle, will be described in detail hereinafter, in connection with FIG. 2. Near the upper end of receptacle 1, a threaded fitting 3 is sealed through the receptacle wall; this provides a connection for admitting the gas whose flow is to be measured into the interior of the receptacle.

A horizontally-extending shaft 4, which extends diametrically across receptacle 1, is mounted for rotation in the lower end of this receptacle. One end of this shaft is positioned in an internal cylindrical recess in the cylindrical side wall of the receptacle, and the opposite end of this shaft passes through the receptacle side wall, being sealed therethrough by means of an O-ring 5 which surrounds the shaft. An actuating arm 6 is secured to the outer end of shaft 4, for manual actuation of this shaft as desired. Arm 6 is spring loaded by means of a spring 7 one end of which is fastened to one end of the arm and the other end of which is fastened to base 2; spring 7 biases the arm to the position illustrated in FIG. 1. That end of arm 6 opposite to spring 7 is free to be manually actuated (against the force of spring 7) to rotate shaft 4 through an angle less than 180°; spring 7 returns arm 6 to the position illustrated when the same is released.

A cam 8 is secured to shaft 4 to be rotated thereby, this cam being located approximately on the axis of receptacle 1. A cup-shaped basket 9, having a multiplicity of perforations 51 in its bottom end, is supported by cam 8, inside receptacle 1. The diameter of basket 9 is such that it is free to be moved up and down by cam 8, inside receptacle 1. Basket 9 is illustrated in its "normal" or "raised" position in FIG. 1; this is its position when arm 6 is not being manually actuated (depressed). A tubular member or ring 10, the O.D. of which is less than the I.D. of basket 9, is supported by the bottom end of this basket, within the same. As illustrated in FIG. 1, the length of ring 10 is slightly less than the height of basket 9, although this is not essential; it can be equal to the basket height, if desired. Ring 10 has drilled through its wall, in a direction transverse to the longitudinal axis of the tube, a plurality (say four) of holes 11 which are equally spaced around the circumference of the ring. When the device is set up for operation, the center lines of holes 11 extend substantially horizontally, as shown in FIG. 1.

In use, receptacle 1 is filled to a level indicated at 12 with a suitable soap solution. This soap solution should be one in which thin films or bubbles can readily form. This soap solution, of course, fills the entire lower portion of receptacle 1, from level 12 down to the top of base 2; cam 8 and also that portion of shaft 4 within receptacle 1 are submerged in the soap solution.

As previously stated, basket 9 is illustrated in FIG. 1 in its "raised or uppermost position, wherein the maximum "throw" or eccentricity of cam 8 (with respect to the center line of shaft 4) is operative on basket 9. The soap level 12 and the "throw" of cam 8 (and also the vertical locations of holes 11 in ring 10) are so arranged that, when arm 6 is manually depressed to rotate shaft 4 and cam 8, this cam lowers basket 9 and ring 10 from the FIG. 1 position to a position such that holes 11 become immersed in the soap solution.

An upright transparent flow tube 13, whose O.D. is such as to have only a small clearance with respect to the I.D. of ring 10 and which tube has a known I.D., is positioned with its lower end just above the soap level 12. Elements 1, 9, 10, and 13 are all coaxial. The upper end of this flow tube is open to the atmosphere, or it can be connected to other disposal facilities. The gas whose flow is to be measured flows through fitting 3 into receptacle 1, and it can then pass into the open upper end of basket 9, and through holes 11 into the lower end of tube 13, and thence upwardly and out of the device via this latter tube. In this connection, it is pointed out that, for purposes of clarity, the holes 11 are shown somewhat above where they would be, in an actual device. Actually, holes 11 are bolew the lower end of tube 13 and in the FIG. 1 position are above the soap level 12. Of course, when arm 6 is depressed, holes 11 dip into the soap solution, as previously described.

Flow tube 13 is supported in position, and also sealed into the upper end of receptacle 1, by means of a rubber stopper 14 which is tapered to seal into the upper end of receptacle 1 and which has therein a central hole drilled to tightly fit the O.D. of tube 13.

When the actuating arm 6 is manually depressed to lower basket 9 and ring 10 further into the soap solution (from its FIG. 1 position), thereby submerging holes 11 in the solution, thin soap films form in these holes. These thin films coalesce and are transferred under the urging of the gas to tube 13 as a single thin, plate-like film when the arm 6 is released to raise ring 10 (assuming that gas is then flowing in through fitting 3), the gas passing through the holes 11 and forcing or driving the flat, plate-like soap film upwardly (ahead of the gas) through tube 13. When the actuating arm 6 is depressed and released in a rapid motion, one soap film at a time can be readily produced for movement upwardly through tube 13.

The device of this invention utilizes the travel of the soap film previously mentioned through the tube 13 of known diameter, to measure gas flow rates. More specifically, a detection system is used in conjunction with a timer to measure the time of travel of the soap film (as driven by the gas) through a known length of tube 13, which (since the I.D. of this tube is known) provides a known volume of tube. Assuming no appreciable diffusion of the gas through the film occurs, there is thus determined the time required for the gas to travel through a measured volume. From this, the flow rate of the gas (in volume units per unit of time) can be readily calculated.

For timing the travel of the soap film upwardly through the known volume in tube 13, a first or lower detector is located at the lower end of the known volume, this detector starting the timer when the soap film reaches such detector; a second or upper detector is located at the upper end of the known volume, this latter detector stopping the timer when the soap film reaches such latter detector.

The lower detector comprises a photocell 15 and a light source (lamp) 16 mounted in an annular block 17 which surrounds tube 13 and which rests on top of stopper 14. The light source 16 and the photocell 15 are mounted diametrically opposite each other, in the same horizontal plane, in such a way that the lamp 16 can project a beam of light through the transparent tube 13 and onto photocell 15. The lamp 16 is energized from a source 18 of electrical energy of suitable voltage, while the photocell 15 is connected by means of a pair of electrical leads 19 to the "Start" input of a suitable timer, e.g., a "Beckman/Berkeley Model 5230 Universal EPUT and Timer." When the soap film, rising in the tube 13, passes between the photocell 15 and the light source 16, the light is partially blocked off from the photocell 15. This causes a change in the effective electrical resistance of the photocell, which is detected by means of a more or less conventional electrical circuit (not shown), producing an electrical signal which is transmitted to the timer to trigger or "start" the same.

A spacing ring or tube 20, which is calibrated in length in order to establish the volume through which the travel-time of the soap film is measured, surrounds tube 13 and rests atop block 17; a block 21 (in which the upper detector is mounted) is positioned atop ring 20, thereby fixing the distance between the lower and upper detectors, and establishing the known (measurement) volume of tube 13. Block 21 is similar in construction to block 17. Different rings, each of a different calibrated length, may be used selectively at 20 in order to change the measurement volume of tube 13. The upper detector comprises a photocell 22 and a light source (lamp) 23 mounted in annular block 21, which latter surrounds tube 13 and rests on top of ring 20. The light source 23 and the photocell 22 are mounted diametrically opposite each other, in the same horizontal plane, such that lamp 23 can project a beam of light through tube 13 and onto photocell 22. Lamp 23 is energized from source 18, while photocell 22 is connected by means of leads 24 to the "Stop" input of the timer. When the soap film passes between the light source 23 and the photocell 22, the light is partially blocked off from the latter, producing an electrical signal which is transmitted to the timer to "stop" the same. Thus, the time of travel of the soap film through a known volume of tube 13 is measured by the timer, under the control of the upper and lower photoelectric detectors which are located at the respective ends of this volume.

The flow measuring device described enables accurate measurement of gas flow, from very small flow rates to high flow rates, depending on the diameter of the flow tube 13. The device can be calibrated in any units, such as cubic centimeters per second (cc./sec.) or cubic feet per minute (ft.$^3$/min.). The range of rates that has been achieved, in an actual device which was built according to this invention and successfully tested, is from approximately 0.5 cc./sec. to 120 cc./sec., which in different units is from approximately 0.001 ft.$^3$/min. to 0.25 ft.$^3$/min. The repeatabiltiy achieved at any one rate gives an average precision of $\frac{1}{10}$ of 1% (.001) of the flow rate measured. The above-mentioned flow rates are not necessarily the limits of this type of flow measuring device, but are merely given as an example of what has been achieved.

It is pointed out that this device or instrument can be used in any situation where accurate flow rate measurement is desired, as long as the gas used does not have a diffusion rate through the soap film which is high in relation to the time of travel of the film.

The previous description has concerned itself with a type of device applicable to low pressure gases. There will now be described a somewhat modified construction, using the same principles, which can be used for measurements at high pressure. Refer now to FIG. 2, which is a vertical section through a gas flow measuring device of this modified construction. In FIG. 2, elements which are the same as those of FIG. 1 are denoted by the same reference numerals. A bottom closure or plug member 25 is firmly secured to base 2, as by means of a pair of screws 26 which pass through base 2 and thread into tapped holes provided in closure 25. Above base 2, closure 25 is provided with male threads which mate with female threads provided at the lower end of an elongated upright cylindrical outer container or housing 27, thereby to secure the container to the base. An O-ring 28, mounted in a groove provided in the surface of plug 25 and engaging the inner cylindrical wall of housing 27, completes the pressure seal at the lower end of the housing.

A shaft 4 is mounted for rotation in the lower end of housing 27, in the same manner as shaft 4 is mounted for rotation in receptacle 1 of FIG. 1, one end of this shaft being sealed through the housing wall by means of O-ring 5. Actuating arm 6 is secured to the outer end of this shaft, just as in FIG. 1, and this arm is loaded or biased by means of spring 7, just as in FIG. 1. Shaft 4 carries a centrally-located cam 8.

A one-piece bubble cup, denoted generally by numeral 29, is supported by cam 8, this bubble cup being free to be moved up and down by cam 8, inside housing 27. Bubble cup 29 includes an outer cup-shaped element 30 having a plurality of holes 31 in its bottom end; the bottom end of element 30 rests on and is supported by cam 8. Bubble cup 29 also includes an inner, concentric tubular element 32 which is shorter in length than the cylindrical side wall of element 30, the upper end of element 32 being joined to the upper end of element 30 by means of a horizontally-extending flanged area 33 which has a plurality of holes 34 drilled therethrough. Since element 32 is shorter in length than element 30, the lower end 35 of element 32 is spaced above the bottom end of element 30.

FIG. 2 illustrates the bubble cup 29 in its "raised" or uppermost position, wherein the maximum "throw" or eccentricity of cam 8 (with respect to the center line of shaft 4) is operative on this cup. The housing 27 is filled with soap solution up to a level 12 which, in the illustrated "raised" position of bubble cup 29, is located above the bottom of the outer element 30 but below the lower end 35 of the inner element 32. When the actuating arm (which is attached to shaft 4) is manually depressed to rotate shaft 4 and cam 8, this cam lowers bubble cup 29 from the FIG. 2 position to a position such that the lower end 35 of inner element 32 becomes immersed in the soap solution.

At its upper end, housing 27 is provided with internal threads, and an externally-threaded top closure or plug member 36 is screwed into the housing threads, thereby to close the upper end of the housing. An O-ring 37, mounted in a groove provided in the surface of plug 36 and engaging the inner cylindrical wall of housing 27, completes the pressure seal at the upper end of the housing. Plug 36 has therein, on its inner or lower end, a cylindrical recess 38, in which the upper end of flow tube 13 fits tightly. The upper end of tube 13 is fastened tightly (as by means of glue) in recess 38, so that this tube is supported by the upper closure 36, and hangs downwardly therefrom. The I.D. of tube 13 is known, and the O.D. of this tube is such as to have only a small clearance with respect to the I.D. of element 32; the length of the calibrated flow tube 13 is such that the lower end thereof is located slightly above the lower end 35 of element 32 when the bubble cup 29 is in the "raised" position of FIG. 2.

A hole 39 is drilled and tapped from the outer end of plug 36, to provide a threaded inlet coupling or connection for admitting the gas whose flow is to be measured into the interior of housing 27. From the bottom of hole 39, a hole 40 is drilled entirely through the plug 36 to open into housing 27 at a point radially outwardly with respect to recess 38 and flow tube 13; coupling 39 and hole 40 thus provide a gas inlet, for admitting gas into the annular space between flow tube 13 and housing 27. The gas flows downwardly in this annular space, thence through holes 34 and through the annular space between elements 30 and 32 of the bubble cup 29, from whence it flows upwardly through the open lower end 35 of element 32 into the bottom of flow tube 13. It can then flow upwardly through flow tube 13.

A central hole 41 is drilled and tapped from the outer end of plug 36, to provide a threaded outlet coupling or connection for withdrawing the gas from the device. From the bottom of hole 41, a hole 42 is drilled entirely through the plug 36 to open into the upper end of flow tube 13; coupling 41 and hole 42 thus provide a gas outlet, for leading the gas from the upper end of tube 13 out of the device.

When the actuating arm 6 is manually depressed to lower bubble cup 29 further into the soap solution (from its FIG. 2 position), a thin soap film forms across the lower open end 35 of element 32 as this end dips into the soap solution. This thin, plate-like film is transferred under the urging of the gas to tube 13 when the arm is released to raise bubble cup 29 (assuming that gas is then flowing in via inlet 39), the gas forcing or driving this film upwardly through tube 13.

As in FIG. 1, a detection system is used in conjunction with a timer to measure the time of travel of the soap film (as driven by the gas) through a known length of tube 13, which (since the I.D. of this tube is known) provides a known volume of tube. Again, two detectors are utilized, one at each respective end of the known volume, the lower detector starting the timer when the soap film reaches this detector and the upper detector stopping the timer when the film reaches this latter detector.

The device illustrated in FIG. 2 utilizes contact-type detectors for timing the travel of the soap film through the known length of flow tube or calibration tube 13.

Each of these detectors comprises a conducting ring inside the flow tube, with a conducting probe centered within the ring, i.e., such that the probe is substantially on the longitudinal axis of tube 13. Tube 13 and bubble cup 29 are coaxial. The soap film is sufficiently conductive to complete a circuit between each probe and its respective ring.

The lower detector thus comprises a conducting (metallic) ring 43 fastened in position within tube 13, near the lower end thereof and at the lower end of the known or measuring volume of this tube, and also a conducting (metallic) probe 44 which extends axially upwardly up of tube 13 for a short distance and whose upper end is located at the lower end of the measuring volume of this tube. An electrical lead 45 extends through the wall of tube 13 and is electrically connected to ring 43; this lead extends upwardly within the annular space between tube 13 and housing 27, and is sealed through the top closure 36. Lead 45 is a common or ground lead. An electrical lead 46 extends through the wall of tube 13 and is electrically connected to the lower end of probe 44; this latter lead extends upwardly within the annular space between tube 13 and housing 27, and is sealed through the top closure 36.

When the probe 44 and ring 43 become wetted with the soap solution, they will not interfere with the passage of the soap film upwardly through tube 13.

Leads 45 and 46 are connected to a circuit, including a direct current power supply and the "Start" input of the timer, in such a way that when the conductive soap film leaves the upper end of probe 44 (the film being also in contact with ring 43 at this time, as the film is traveling upwardly through tube 13), an electrical signal is transmitted to the timer to trigger or "start" the same.

The upper detector comprises a conducting (metallic) ring 47 fastened in position within tube 13, near the upper end thereof and at the upper end of the known or measuring volume, and also a conducting (metallic) disc 48 (which serves as an upper probe) whose center is located on the longitudinal axis of tube 13 and whose lower face is located at the upper end of the measuring volume of tube 13. One end of a short electrical lead 49 extends through the wall of tube 13 and is electrically connected to ring 47; the other end of this short lead connects to the common or ground lead 45, to which reference was previously made. An electrical lead 50 is connected to disc 48, from whence it extends upwardly out the upper end of tube 13, and is sealed through the top closure 36.

It is pointed out that the time measurement starts when the soap film leaves the lower probe 44 (as previously described), and from this point on there is no restriction in the tube 13 until the film reaches the "stop" or upper probe 48; thus, the soap film is free to travel upwardly in tube 13, as driven by the gas flow being measured.

Leads 45 and 50 are connected to a circuit, including the aforementioned power supply and the "Stop" input of the timer, in such a way that when the conductive soap film reaches the disc or probe 48 (the film being also in contact with ring 47 at this time, as the film is traveling upwardly through tube 13), an electrical signal is transmitted to the timer to "stop" the same. Thus, the time of travel of the soap film through a known volume of tube 13 is measured by the timer, under the control of the upper and lower contact-type detectors (probe-ring combinations) which are located at the respective ends of this volume.

The disc 48, which serves as the upper probe, is used to ensure better conductance between this probe and ring 47. The soap film becomes thinner as it travels up tube 13, because some of the film is left on the inner wall of this tube in order to wet the tube; therefore, the film is not as conductive (electrically) at the top of the tube as at the bottom thereof. The disc reduces the length of the electrical path (through the film) from the upper probe 48 to the ring 47.

The invention claimed is:
1. In a gas flow measuring device, a flow tube, means for causing the gas whose flow rate is to be measured to flow through said tube, a receptacle containing a soap solution, a member within said receptacle and having an aperture through which said gas flows on its way to said tube, said member being mounted for movement with respect to said receptacle such that said aperture is movable into and out of said soap solution; manually-operable means for moving said aperture into and then out of said soap solution, thereby to form a soap film across said aperture which is transferred to said tube by said gas, and means for determining the time required for said film to traverse a known volume in said tube.

2. A measuring device as recited in claim 1, wherein said determining means includes two separate detecting means, one located at each respective end of said known volume, for sensing the passage of said film past the respective locations of such detecting means.

3. A measuring device as defined in claim 2, wherein each of said detecting means comprises a light source and a photocell mounted on opposite sides of said tube.

4. A measuring device as defined in claim 2, wherein each of said detecting means comprises a pair of spaced metallic electrodes mounted within said tube.

5. A measuring device as recited in claim 1, wherein said determining means comprises two separate detecting means, one located at each respective end of said known volume, for sensing the passage of said film past the respective locations of such detecting means, an electrical timer having "start" and "stop" inputs; means connecting the detecting means at the upstream end of said volume to said "start" input, and means connecting the detecting means at the downstream end of said volume to said "stop" input.

References Cited by the Examiner

UNITED STATES PATENTS 2,967,450  1/1961  Shields et al. _____ 73—194 X
3,000,207  9/1961  Goffe _____ 73—113

OTHER REFERENCES

Journal of the Society of Chemical Industry: article entitled, "Soap Film Calibrators," by W. J. Gooderham, vol. 63–64, November 1944, pp. 351–352.

RICHARD C. QUEISSER, *Primary Examiner.*